(12) United States Patent
Sulzbach et al.

(10) Patent No.: US 8,011,016 B2
(45) Date of Patent: Aug. 30, 2011

(54) SPM PROBE WITH SHORTENED CANTILEVER

(75) Inventors: Thomas Sulzbach, Weisendorf (DE); Christoph Richter, Fürth (DE)

(73) Assignee: NanoWorld AG, Neuchatel (CH)

( * ) Notice: Subject to any disclaimer, the term of this patent is extended or adjusted under 35 U.S.C. 154(b) by 295 days.

(21) Appl. No.: 12/402,576

(22) Filed: Mar. 12, 2009

(65) Prior Publication Data
US 2009/0241233 A1   Sep. 24, 2009

(30) Foreign Application Priority Data
Mar. 20, 2008  (EP) ..................................... 08005248

(51) Int. Cl.
*G12B 21/08* (2006.01)
(52) U.S. Cl. ................ 850/53; 850/52; 850/56; 850/57; 850/60; 250/306; 250/307; 73/105
(58) Field of Classification Search .................... 850/21, 850/40, 45, 52, 53, 56, 57, 60, 29, 604; 250/306, 250/307; 73/105
See application file for complete search history.

(56) References Cited

U.S. PATENT DOCUMENTS

| 5,450,746 | A | * | 9/1995 | Howard ........................... 73/105 |
| 5,753,812 | A | | 5/1998 | Aron et al. |
| 5,753,912 | A | * | 5/1998 | Matsuyama ..................... 850/60 |
| 5,966,787 | A | * | 10/1999 | Nakayama et al. .......... 29/25.35 |
| 2008/0210864 | A1 | * | 9/2008 | Paget et al. ................... 250/306 |

FOREIGN PATENT DOCUMENTS

| EP | 1 359 593 | | 2/1970 |
| JP | 5-018740 | | 1/1993 |
| JP | 8-262040 | | 10/1996 |
| JP | 10-307144 | | 11/1998 |
| JP | 10307144 A | * | 11/1998 |

* cited by examiner

*Primary Examiner* — Robert Kim
*Assistant Examiner* — Michael Logie
(74) *Attorney, Agent, or Firm* — Renner, Otto, Boisselle & Sklar, LLP (57) ABSTRACT

An SPM probe with an elongated support element and a cantilever projecting beyond the front face of the support element and carrying a scanning tip, with the cantilever arranged at a front face side of the support element of the probe, protruding there from a front face side flank, and with the support element having an essentially trapezoidal cross-section with a longer and a shorter transverse edge at the face side flank, and also with critical corners at one of the transverse edges of the face side flank that are closest to a sample during the scanning process, wherein the support element has an elongated raised portion extending in the longitudinal direction of the support element and of the cantilever, with the raised portion having an essentially trapezoidal cross-section, and with the cantilever arranged on the face side on a narrow transverse edge of the raised portion of the support element, and with the raised portion with the cantilever arranged preferably at the longer transverse edge of the face side flank of the support element, and with the plane extending between the scanning tip and a theoretical straight line passing through one of the critical corners, parallel to the lateral longitudinal edges of the underside of the support element, forming an angle of tilt of at least 5 degrees relative to the transverse edge.

14 Claims, 5 Drawing Sheets

SPM PROBE WITH SHORTENED CANTILEVER

CROSS-REFERENCE TO RELATED APPLICATION

The present application claims priority under 35 USC §119 to European Patent Application No. 08 005 248.3, filed on Mar. 20, 2008, the entire disclosure of which is incorporated herein by reference.

TECHNICAL FIELD OF THE INVENTION

The invention relates to an SPM probe with a support element and a cantilever that projects laterally from the support element and carries a scanning tip at its free end, and a process for manufacturing such probes.

DESCRIPTION OF THE RELATED ART

Scanning probe microscopes are generally known and are used for high-resolution scanning of the surface of samples by means of sensitive sensors, so-called SPM probes. In all these microscopes, probes are used whose sensor is formed by a spring-action micro-cantilever that has at one end a support element for attachment to a probe carrier and at the other end a sensor tip for scanning the sample.

Scanning probe microscopy has become an established technique for surface analysis that permits, among others, the imaging of surface topographies with a resolution of a few nanometers, even down into the atomic range.

An essential core element of this technology is the scanning probe. The nature and the quality of the probes contribute decisively to the achievable resolution of the surface analysis. For the manufacture of the probes, different processes have been established that are based either on the etching of monocrystalline silicon or on thin layers, preferably consisting of silicon nitride.

In U.S. Pat. No. 5,753,812, an SPM probe is disclosed with a elongated support element and a cantilever projecting from the face of the support element that carries a scanning tip and is mounted on a front face of the support element. The cantilever projects from the front face flank, and the support element has a trapezoid cross-section. The cantilever is mounted on the shorter of the two transverse edges of the front face flank.

In JP 8-262040, an AFM scanning probe and a process for the manufacture thereof are disclosed whose scanning tip has a tetrahedral shape. The cantilever is made of silicon or silicon nitride, and the scanning tip is formed on the face of the cantilever and has lateral flanks that are determined by the <100> and <111> planes of the silicon crystal.

In EP 1 359 593 A1, an SPM sensor and a process for the manufacture thereof are disclosed, with a sensor tip protruding from the surface of the cantilever at the free end of the cantilever, with the cantilever and the three-surface sensor tip consisting of mono-crystalline <100> silicon.

JP 10-307144 discloses a cantilever chip with a support element, a cantilever, and a scanning tip wherein the support element is made of mono-crystalline silicon and has two support element parts of different shape that are arranged one above the other and are connected with each other. The cantilever is mounted on the lower support element part that has a cruciform shape. The upper support element part has a shape that is common for support elements of SPM probes.

JP 5-018740 discloses a surface scanning probe with a cantilever followed by a scanning tip that are made as a thin film of silicon oxide or silicon nitride, and with a support element that has beveled corners on the side associated with the cantilever.

A general and significant disadvantage of scanning probe microscopy is the low speed of the analysis because the probe scans the surface point by point. Here, the scanning speed is limited by the scanning mechanism, on the one hand, but also by the resonant frequency of the cantilever of the probe. Current developments in the field of scanning probe microscopy address this problem by developing new systems and probes that operate at a distinctly higher speed.

In order to achieve the necessary increase of the resonant frequency in the probes for such fast scanning probe microscopes without changing the stiffness of the cantilever at the same time, the size of the cantilever must be distinctly reduced in all dimensions. Typically, these high-frequency cantilevers have a length of less than 20 µm, a width of less than 5 µm, and a thickness of significantly less than 1 µm, and are therefore smaller by a factor of approximately 10 than current cantilevers of SPM probes, at least in terms of length and thickness.

This reduction of the dimensions places high demands especially on the reproducibility of length and thickness of the cantilever that are not met by the commonly used processes for the manufacture of SPM probes. While numerous approaches already exist for the reduction of thickness fluctuations, based on etch stop techniques with the help of additional intermediate layers in the base material (for example 'silicon-on-insulator' substrates, implanted intermediate layers, etc.), the solutions proposed until now for a defined length of the cantilever are insufficient. The commonly used method of definition of the cantilever length by a lateral flank of the support element is very imprecise due to the large vertical distance between the starting plane of the etching process and the cantilever. Fluctuations in the inclination of the etching flank and/or fluctuations of the thickness of the base material lead to significant variations of the cantilever length that are no longer acceptable for short cantilevers. Even when cantilevers are mounted on a separately manufactured support element, by anodic bonding for example, the fluctuations of the mounting process are too large for the intended cantilever sizes so that the process cannot be used for very small cantilevers.

A common approach to the solution of this problem is a cantilever design with a significant widening that, as a rule, exceeds the width of the actual cantilever by a multiple. In choosing this design, the goal is to realize a cantilever that is determined quasi from a lithographic definition step and that is attached to a short, very wide overhang (of the widening referred to above). The tolerances of the etching process of the support element are to be shifted thereby from the actual cantilever to the length of this overhang. In reality, however, the length of the overhang from which the actual cantilever is suspended has a large influence on the oscillation characteristics of the cantilever as a whole so that said characteristics again depend to a considerable degree on the tolerances of the etching process of the support element. Although alternative known processes for a subsequent shaping of the cantilever by means of ablation with a focused ion beam will achieve the objective, they are costly individual-production steps.

Beside these difficulties regarding the manufacture of such SPM probes with cantilever and integrated scanning tip that are generally caused by the reduced dimensions, the problem of unintentional contact of the support element instead of the scanning tip becomes much greater with short cantilevers. The probes are commonly mounted in the scanning probe microscope at a shallow angle of typically 8 to 15 degrees relative to the surface of the sample to be scanned. This places the support element of the probe in the area of the cantilever attachment point very close to the surface of the sample so that, if the probes are slightly tilted laterally by a few degrees, the corners of the support element may contact the sample surface. This would prevent the intended function and possibly even damage the sample to be examined. In order to prevent this, the support element of the probes currently in use are manufactured so that an edge of minimum length is formed on the side where the cantilever is mounted, with the effect that the distance resulting from the length of the cantilever, the height of the scanning tip, and the mounting angle of the probe is sufficient to prevent the support element corners from making contact even if the probe is slightly tilted.

The design used most frequently are beveled corners of the support element that lead to a short edge on the cantilever, while simultaneously ensuring the ease of manipulation of the probe as a whole by means of a distinctly larger width of the actual support element. The manufacture of the short edge of the support element as described above is subject to significant fluctuations in commonly used manufacturing processes such as wet-chemical anisotropic depth etching, with the consequence that this type of shaping cannot simply be applied to the case of smaller cantilevers and the significant size reduction of the support element edge that is necessary for these. Alternative processes like the sawing of the lateral flanks of the support element soon reach their limits because they can only produce flanks that are oriented parallel to the direction of the cantilever. However, due to their narrow width, support elements that are sawed sufficiently narrow with respect to tilting become impossible to manipulate.

Therefore, the present invention addresses the problem of proposing an SPM probe with a short cantilever where the corners of the support element or of the short edge on which the cantilever is mounted are incapable of contacting the surface of the sample when the probe is tilted by a few degrees. The invention addresses the additional problem of creating a process for manufacturing the proposed SPM probe.

SUMMARY OF THE INVENTION

According to the invention, these problems are solved by an SPM probe and method as described herein.

An aspect of the invention is to give the support element a special form wherein, compared with conventional probes, the lateral distance of the scanning tip to the longitudinal side edges of the nearest support element surface is significantly reduced and/or the distance between the cantilever top side carrying the scanning tip and the associated support element surface is significantly increased in comparison with the conventional probes.

The SPM probe according to the invention has an elongated support element with an essentially trapezoidal cross-section, with the cantilever placed at a front face side of the support element on a lateral edge, preferably the wide lateral edge. An essentially trapezoidal cross-section may also mean rectangular and/or stepped cross-sections. A plane extending between the scanning tip and a theoretical straight line passing through a critical corner associated with the lateral edge, parallel to the lateral longitudinal edges of the underside of the support element, forms an angle of tilt of at least 5 degrees relative to the transverse edge. 'Critical corner' means the corner that is closest to the sample during the scanning process. If, at the front transverse edge, two corners each are formed on both sides of the cantilever, for example in the form of a bevel, the critical corner is the one that has the shortest distance from the cantilever and would be the first to contact the surface of the sample. In addition, it would be reasonable to widen the support element from the front face side of the probe with the cantilever towards the opposite rear face side of the probe in order to improve the operability of the probe. As a consequence, the probe can be tilted up to 5 degrees laterally without the transverse edge of the support element facing the probe contacting the sample surface, thereby largely precluding damage to the probe.

The support element has an elongated raised portion extending in the longitudinal direction of the support element, with at least the raised portion having an essentially trapezoidal or rectangular cross-section, and with the cantilever mounted on the face side on the narrow transverse edge of the raised portion of the support element.

The creation, on the support element, of the raised portion at whose narrower end the cantilever is fixed and whose height compensates for the possible lateral tilt of the probe reliably prevents the support element from contacting the sample surface, in particular in case of small, short cantilevers. By shifting the definition of the edge with the critical corner of the support element from the rear side of the support element to the front side of the support element where the cantilever is located, a simpler and, in particular, more reproducible manufacture becomes possible.

The typically maximum possible tilt due to production tolerances of the SPM measuring system and due to the tolerance of the probe assembly has a magnitude of up to 5 degrees. Contact between the support element edge and the sample surface in case of such a tilt can be reliably avoided if the following is true for the height H of the raised portion, respectively the cantilever attached to it, in relation to the length L of the support element edge:

$$\tan(5°) \times \frac{L}{2} < H$$

This results in approximately:

$$H > \frac{1}{20} L$$

Preference is given to an embodiment of the SPM sensor according to the invention wherein the vertical distance between the cantilever underside that carries the scanning tip and the underside of the support element that carries the raised portion amounts to at least 1/20 of the width of the transverse edge of the support element where the raised portion with the cantilever attached is located.

Advantageously, the base material for the support element and the cantilever is mono-crystalline silicon, and at least the face side flank of the support element to which the cantilever is attached is formed by a <111> plane of the silicon crystal. It is also advantageous if the base material has an integrated etch stop layer in order to define the thickness of the cantilever.

In another preferred embodiment of the SPM probe, the support element including the raised portion consists of one material, and the cantilever of a second material. As material for the support element and the raised portion, glass or silicon may be used, and an amorphous thin film for the cantilever.

In another embodiment of the invention, the support element, the raised portion and the cantilever each consists of different materials. The material for the support element may have glass, for the raised portion silicon, and for the cantilever an amorphous thin film.

In one embodiment of the invention, the lateral flanks of the support element and the lateral flanks of the raised portion may be of identical inclination, and may follow each other in a stepped arrangement. In addition, preference is given to an embodiment of the invention where at least the face side flank to which the cantilever is attached has an undercut shape. Here, it is also an advantage if the lateral flanks of the longitudinal sides of the support element run towards each other preferably in the direction of the cantilever.

In such an embodiment, the side of the support element below the cantilever is preferably formed, at least in part, by a <111> plane of the silicon crystal, and the <111> plane, for manufacturing reasons, is determined by a transverse line as stop line for the etching process, said line running orthogonally to the direction of the cantilever above the underside of the support element on the cantilever side.

According to the process proposed by the invention, the SPM probe according to the invention can be made from one piece, or at least the cantilever can first be manufactured separately and then be connected with the support element and, if present, preferably with the raised portion of the same. If it has a raised portion, the support element can be made from one piece, or may consist of two joined parts.

Advantageously, the process according to the invention consists of at least the following two process steps. First, the shape of the cantilever and of the support element, with or without raised portion, is created by etching steps, starting at a first material side of the base material. Then, the thickness of the cantilever is selected by means of etching, starting at the other (opposite) material side of the base material. Preferably, the lateral longitudinal side flanks of the support element are created starting at a first material side of the base material, and the face side flank to which the cantilever is attached are created by starting at the other, second material side of the base material.

In an advantageous sequence of this process, after the lateral longitudinal side flanks of the support element and/or the raised portion as well as the shape of the cantilever have been created by means of anisotropic etching, starting at a first material side of the base material, and after the relevant material side of the base material including the etched structures has been covered with a protective film that resists the etching process, the flanks at the front and rear face sides of the probe of the support element are etched, starting at the other material side. Specifically, the front face side flank beyond which the cantilever protrudes is made in such a way that the etching, starting at the second material side, is also done by means of an anisotropic wet-chemical process, and that the protective film is removed selectively after the etching process.

Preferably, the SPM probe is produced by means of the following process steps where the cantilever is created first from the silicon layer above the etching stop on the first material side of the silicon wafer. Then, the first material side of the silicon wafer including the etched structures is covered with a protective film that is resistant to the etching process; after that, in the protective film that is resistant to the etching process, a window is opened that excludes the cantilever and simultaneously defines an etching stop line of the support element, with said line determining the length of the cantilever. Then, by means of an anisotropic wet-chemical process, the silicon within the opened window is etched in such a way that the cantilever is completely exposed by etching under it, and that a <111> plane of the silicon crystal is formed below the cantilever. After that, starting at the second material side of the silicon wafer, the support element is created by means of an anisotropic wet-chemical process in such a way that a <111> plane of the silicon crystal forms as a flank of the etching process; this flank meets the <111> plane below the cantilever previously formed from the opposite, first material side of the silicon wafer. The wet-chemical anisotropic etching process is continued in order to create at least in an area below the cantilever a new <111> plane with an undercut flank profile, making use of the fast etching attack on the exposed area between the two <111> planes that were etched from the front and the back sides. Finally, the protective film is removed selectively.

Regarding the creation of the raised portion, it further serves the purpose that, after removal of the protective film, an additional protective film is applied to the back side of the silicon wafer including the etch flanks, and that subsequently the raised portion that includes the cantilever is created from the support element by means of an anisotropic etching process from the front side of the silicon wafer. After that, the new protective film is removed again selectively.

Below, the invention is explained in detail in conjunction with the attached drawings and with reference to different embodiments. Additional characteristics of the invention are given in the drawing and its description in conjunction with the claims. The individual characteristics may be implemented by themselves or in combinations in various embodiments of the invention.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

In the description of the embodiments, terms like top, bottom, top side, bottom side etc. refer to a common operating position of the SPM probe where the cantilever scans from above a sample located below it with a scanning tip pointed downward. In order to show details that would otherwise be obscured, the figures show the probe with a scanning tip pointing upward, contrary to the operating position.

Figure 1:
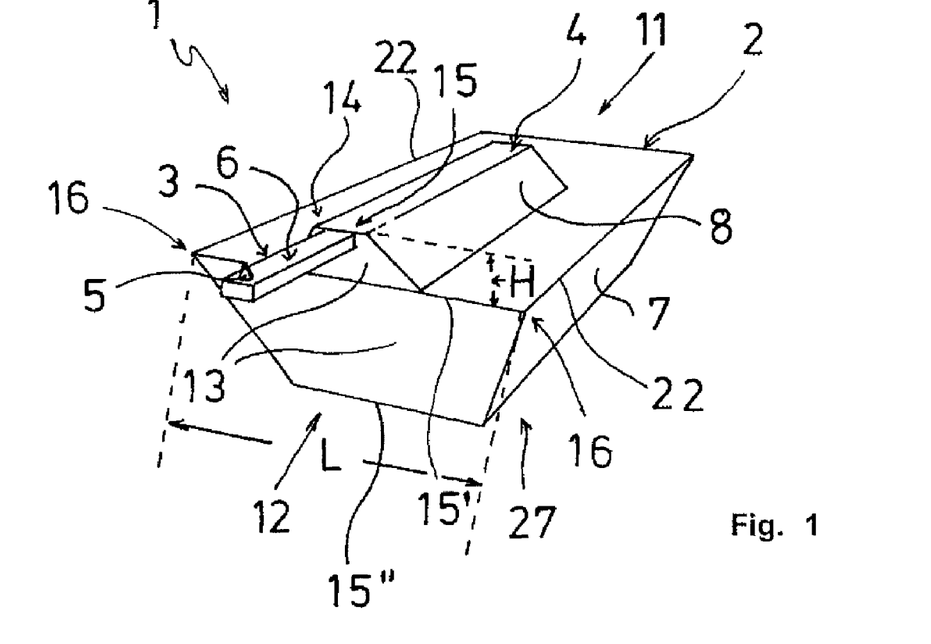
FIG. 1 shows a first SPM sensor with raised portion according to the invention.
Figure 2:
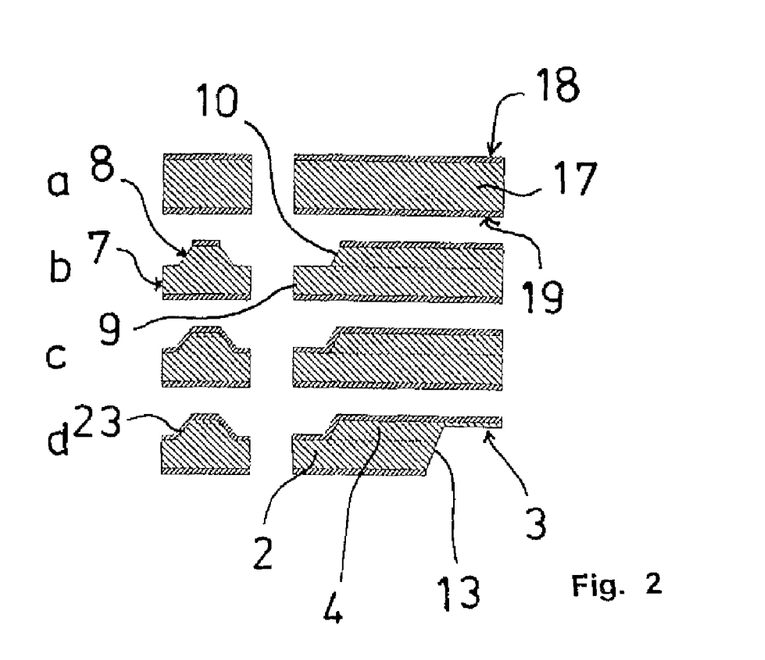
FIG. 2 shows a simultaneous shaping of the cantilever and the raised portion for the sensor according to FIG. 1 with a base material without etch stop layer.

FIG. 1 shows an SPM probe 1 with a support element 2 where the cantilever 3 starts from an elongated raised portion 4 that is carried by the support element 2. As is common, the cantilever 3 carries, remote from the support element 2, a scanning tip 5 on an underside 6 of the cantilever 3. Laterally, the support element 2 has longitudinal side flanks 7 and the raised portion 4 has longitudinal side flanks 8 as well as rear transverse side flanks 9, 10 that each connect two longitudinal side flanks 7 and 8, respectively. On the front face 12 above which the cantilever 3 protrudes, a common front face side flank 13 is located opposite the transverse side flanks 9, 10 at the rear face side 11 of the probe 1. The raised portion 4 comes out of an underside 14 of the support element 2 and is aligned with longitudinal side edges 22 of the support element 2 with equal lateral spacing. The raised position of the cantilever 3 relative to the underside 14 of the support element 2 that is due to the raised portion 4 compensates for a possible lateral tilting of the SPM probe 1.

The support element 2 and the raised portion 4 of the SPM probe 1 have a trapezoidal cross-section, with the cantilever 3 being located on a frontal narrow lower transverse edge 15 of the front face side flank 13 on the raised portion 4. The raised portion 4 is centered relative to the front corners 16 of the support element 2 that are connected by the wider transverse edge 15' of the two transverse edges 15', 15", with the elongated raised portion 4 extending in the longitudinal direction of the support element 2 and of the cantilever 3 for part of the length of the support element 2. The form of the probe 1 may be created either by a simultaneous lithographic definition of the cantilever 3 and the raised portion 4 and the support element 2 or also by independent manufacture thereof in separate steps.

In the former case, the raised portion 4 and the cantilever 3, as shown in the FIGS. 2a to 2d in front and side views, would typically be created together on the underside 14 of the support element 2 from the base material 17, starting at the first material side 18; then, starting at the other (second) material side 19, the cantilever 3 would typically be thinned to its nominal thickness, possibly together with the manufacture of the actual support element 2, with the second material side 19 of the base material 17 forming the top side 27 of the support element 2.

Figure 3:
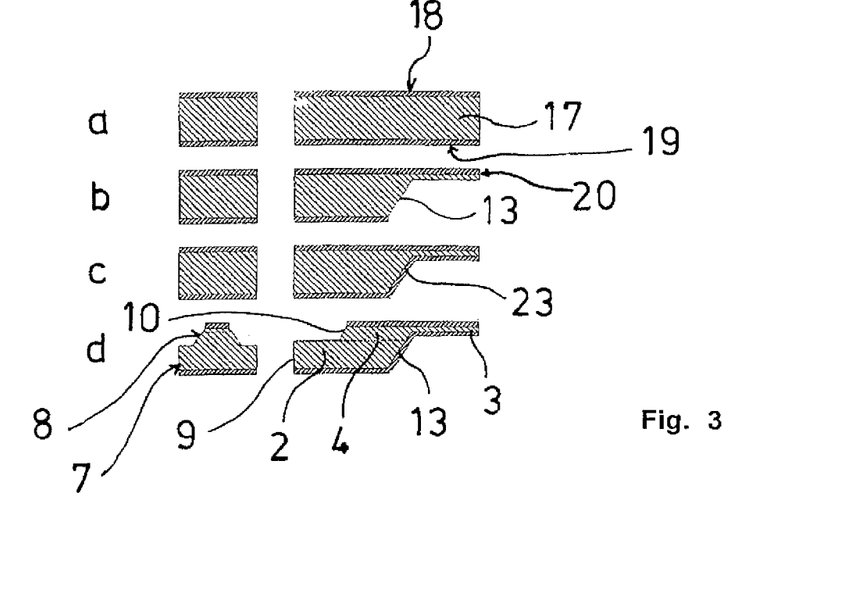
FIG. 3 shows a serial shaping of the cantilever and the raised portion for the sensor according to FIG. 1 with a base material without etch stop layer.
Figure 4:
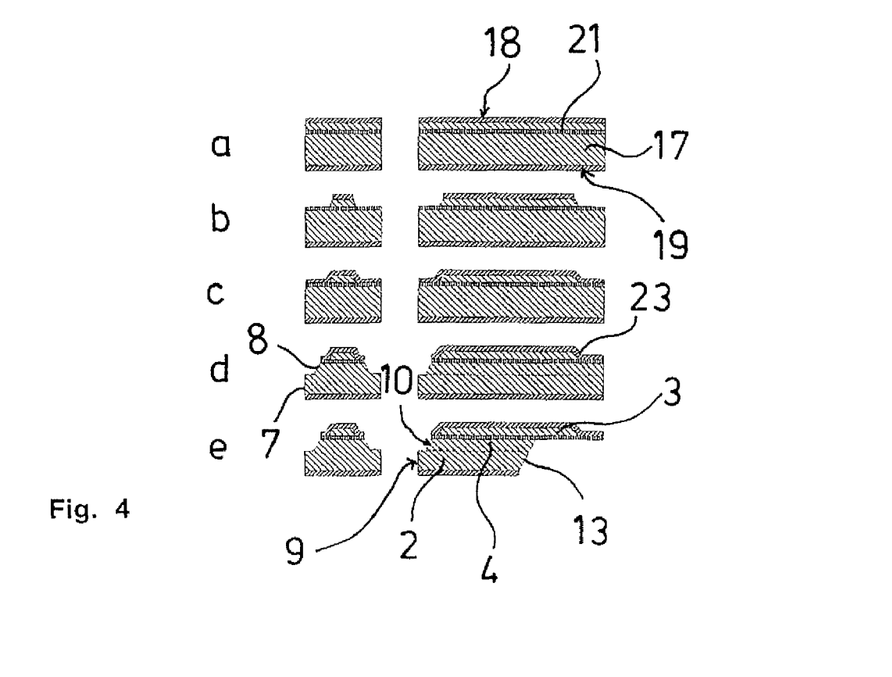
FIG. 4 shows a serial shaping of the cantilever and the raised portion for the sensor according to FIG. 1 with a base material with an etch stop layer.
Figure 5:
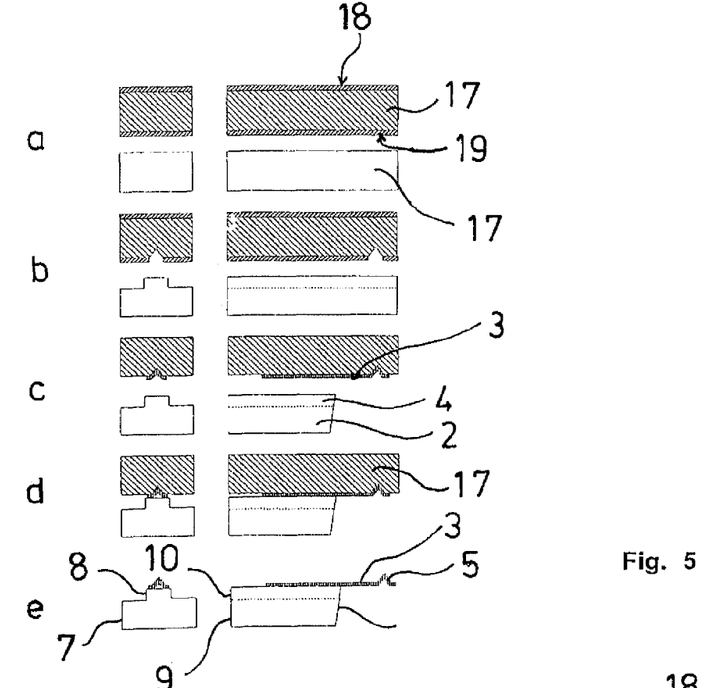
FIG. 5 shows the separate manufacture and shaping of the support element, the raised portion, and the cantilever with subsequent assembly for the sensor according to FIG. 1.

In the additional figures, too, the first material side 18 is associated with the underside 14, and the second material side 19 is associated with the top side 27 of the support element 2. As an alternative, as shown in FIGS. 3a to 3d in the same views, the definition of the thickness of the cantilever 3 can also be achieved by the realization of a thin membrane 20 prior to the manufacture of the raised portion 4 and the cantilever 3 (FIGS. 3a, b). The cantilever 3 and the raised portion 4 are subsequently created from the membrane 20 and the solid base material 17 of the later support element 2 (FIGS. 3c, d).

In case of a separate manufacture, the cantilever 3 and the raised portion 4 are created in two separate process steps.

Usually, the shape of the cantilever 3 would first be created from the base material 17, starting from a first material side 18, and would then be protected, and the raised portion 4 would be created around the cantilever 3. However, a reversal of this sequence is also possible. As in the variant of simultaneous manufacture described above, the thickness of the cantilever 3 can be realized either by subsequent or prior thinning of the base material 17, starting at the second material side 19.

When mono-crystalline silicon is used as base material 17 for manufacturing the probe 1, the raised portion 4 and the cantilever 3 are created, starting at the first material side 18, by means of etching based on one of the known and common wet or dry-chemical anisotropic etching processes. Thinning of the material 17 from the opposite, second material side 19 is also accomplished by wet-chemical anisotropic etching because in the course thereof, exploiting the crystal structure, the inclined face side flank 13 is created that offers the advantage of better accessibility during the application of the probes 1 when commonly a laser beam is focused on the cantilever 3. However, anisotropic dry-chemical processes with commonly vertical walls are also applicable.

A special case of a separate manufacture of the raised portion 4 and of the cantilever 3 results from the use of a base material 17 with integrated etch stop layer 21, as shown in the FIGS. 4a to 4f. In the case of the mono-crystalline silicon, such an etch stop 21 can be produced, for example, by an integrated silicon dioxide layer (so-called 'silicon-on-oxide' or SOI substrates) or by the implantation of high concentrations of boron. Such an integrated etch stop layer 21 can be used for setting the thickness of the cantilever 3 with high precision, by creating the cantilever 3 from the thin layer—that can be made with extremely homogeneous thickness—above the etch stop layer 21, while the support element 2 is essentially created from the remaining base material 17 below the etch stop layer 21. In the thinning procedure described above, the etch stop 21 prevents an enlargement of the variation of the cantilever thickness. This does not affect the creation, by means of a two-step process, of the raised portion 4 referred to above for reducing the danger of contact between the support element 2 and the sample.

Figure 6:
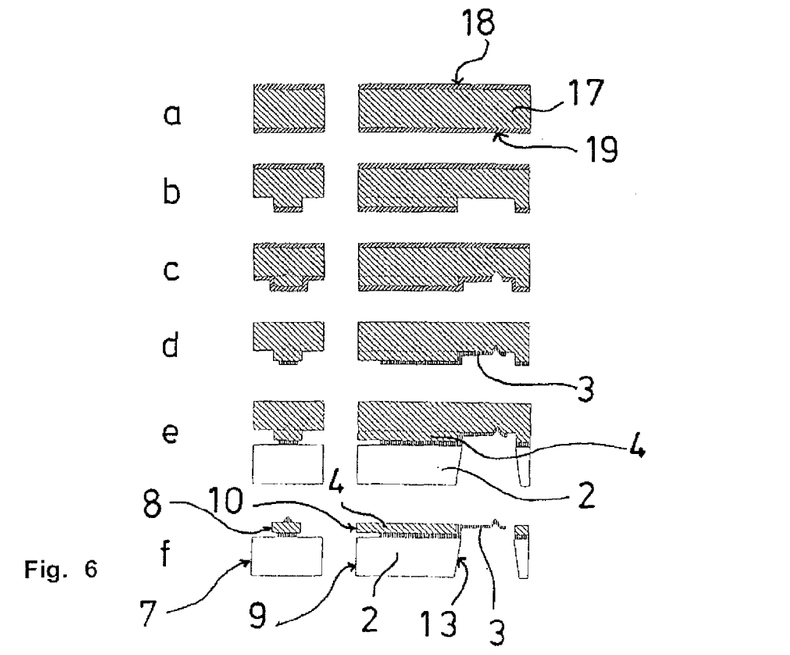
FIG. 6 shows the separate manufacture and shaping of the support element and the raised portion with the cantilever with subsequent assembly for the sensor according to FIG. 1.

In case of probes 1 that were not made by shaping a uniform base material 17 but through the joining of previously separately made cantilevers 3 and support elements 2, the described raised portion 4, as shown by the FIGS. 5a-5e, can also be integrated in the support element 2 prior to the assembly. As an alternative, a manufacture of the raised portion 4 together with the cantilever 3 is also possible, with the raised portion 4 then being mounted together with the cantilever 3, as the FIGS. 6a-6f show, on the support element 2. With a suitable selection of materials and etching methods, the raised portion 4 can be created from the support element 2 even after the assembly, specifically by means of etching.

Another special case of the described form of the support element 2 with raised portion 4 is the forming of the longitudinal side flanks 7 of the support element 2 and of the longitudinal side flanks 8 of the raised portion 4 with an identical inclination and with a stepped transition of the longitudinal side flanks 7 to the longitudinal side flanks 8. This special cross-sectional shape of the support element 2 and the raised portion 4 allows even the considerable tilting of the probe 1 that is necessary for some applications of scanning probe microscopy without the danger of the support element 2 making contact with the sample surface.

A significant advantage of this process with separate forming of the longitudinal side flanks 7, 8 and of the important face side flank 13 starting at different first and second material sides, respectively, is that when anisotropic wet-chemical silicon etching is used, no open corners are produced. In contrast to conventional processes with structuring of the support element 2 and the raised portion 4 starting at only one material side 18, 19 of the base material 17, the corners 16 of the support element 2 are also defined precisely by the slow-etching <111> planes of the silicon monocrystal.

Figure 7:
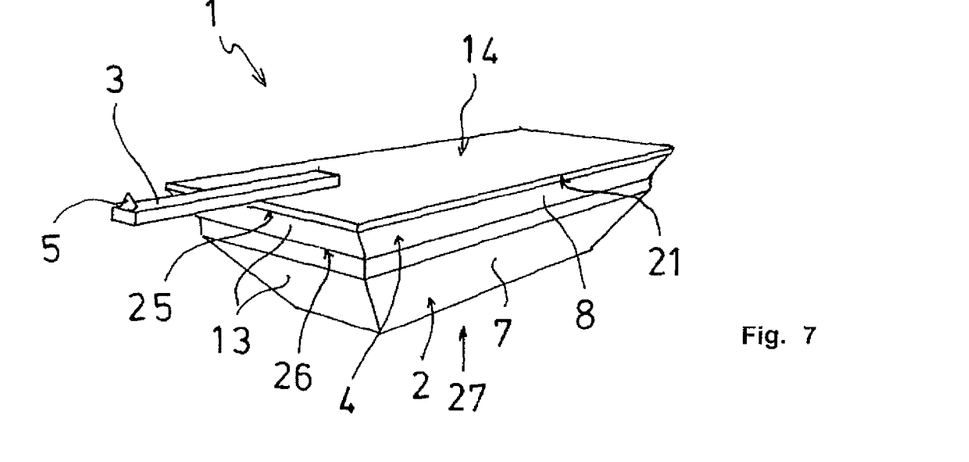
FIG. 7 shows a second SPM probe according to the invention with undercut flanks.

According to the invention, with a probe 1 according to FIG. 7, a precise, homogeneous and reproducible definition of the length of the cantilever 3 is achieved by a lithographical structuring of the transition between the cantilever 3 and the support element 2 from the same first material side 18 of the base material 17. As is common in surface micromechanics, the cantilever 3 is exposed by lateral etching under the masked cantilever 3. Then, the actual shaping of the support element 2 takes place from the opposite second material side 19 of the base material 17, in the course of which the remaining material of the base material 17 under the cantilever 3 is also removed.

When a mono-crystalline silicon is used as base material 17 for the support element 2 along with anisotropic wet-chemical etching methods, the extremely low etching rate of the <111> planes of the crystal can be exploited in order to define the face side flank 13 of the support element 2 under the cantilever 3.

With suitable orientation of the silicon crystal, etching under the cantilever 3 stops exactly at the stop line 25 defined lithographically next to the cantilever 3 perpendicular to the longitudinal axis of the cantilever. As a rule, the resulting etch flank below the cantilever 3 will first be inclined. If the subsequent etching process from the opposite, second material side 19 of the base material 17 is aligned so that the etch flank meets the face side flank 13 of the etching site under the cantilever that was previously structured starting at the first material side 18, and then sufficiently over-etches after the meeting of the etch flanks, an undercut <111> crystal plane will form as face side flank 13 below the cantilever 3 and will end exactly at the previously defined etch stop line 25 next to the cantilever 3. The existing inaccuracies of the adjustment between the first, 18, and the second, 19, material side of the base material 17, as well as thickness fluctuations of the base material 17 only have the effect of producing a ridge of different size below a constriction edge 26 at the front face side flank 13 of the support element 2. As an alternative, the over-etching can be interrupted before the complete face side flank 13 has been formed. Only the undercut <111> plane should already have been formed directly below the cantilever 3. In this manner, an SPM probe 1 according to FIG. 7 with an undercut form of the face side flank 13 can be produced.

Figure 8:
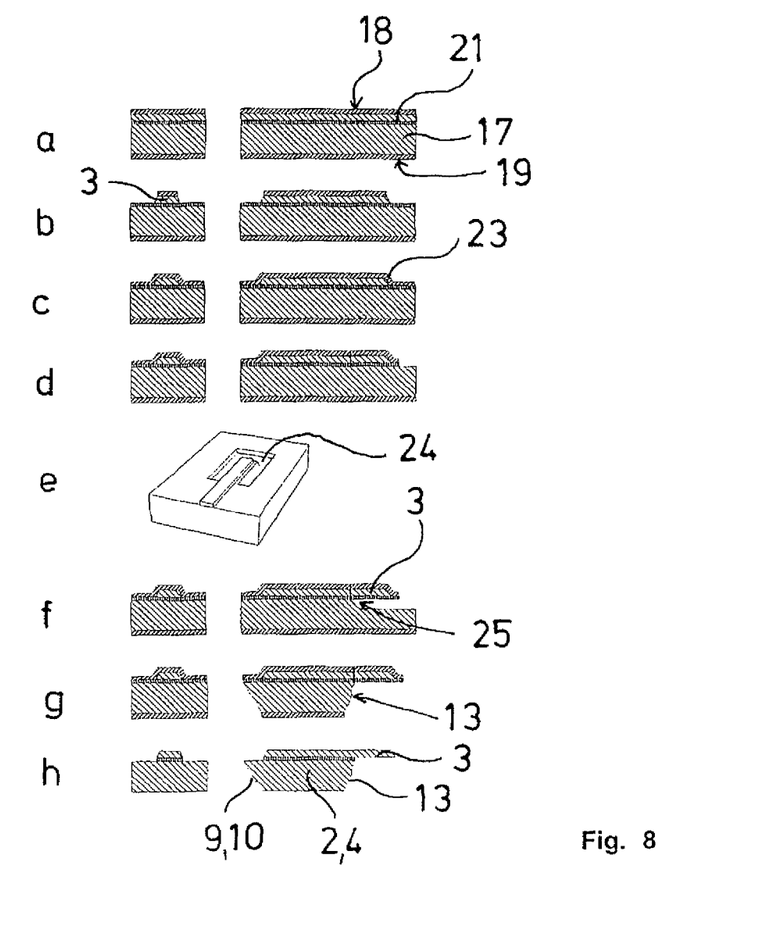
FIG. 8 shows a manufacturing process for the shaping of the SPM probe according to FIG. 7.

If the cantilever 3 in the embodiment described above is also to consist of silicon, the use of a base material 17 with integrated tech stop 21 is necessary. The cantilever 3, and possibly the integrated scanning tip 5, is first formed out of the upper silicon layer, i.e. from the first material side 18 of the base material 17, by means of wet or dry-chemical etching methods according to the illustrations of the FIGS. 8a, b; it is then covered with a suitable protective film 23, consisting of silicon oxide or silicon nitride for example, as shown in FIG. 8c. After that, the etch stop line 25 of the support element 2 is defined lithographically, with the cantilever 3 also having to remain protected, see FIGS. 8d, e. During subsequent etching under the cantilever 3, the integrated etch stop layer 21 prevents an etch attack from the rear on the cantilever 3, as FIGS. 8f, g, h show.

Figure 9:
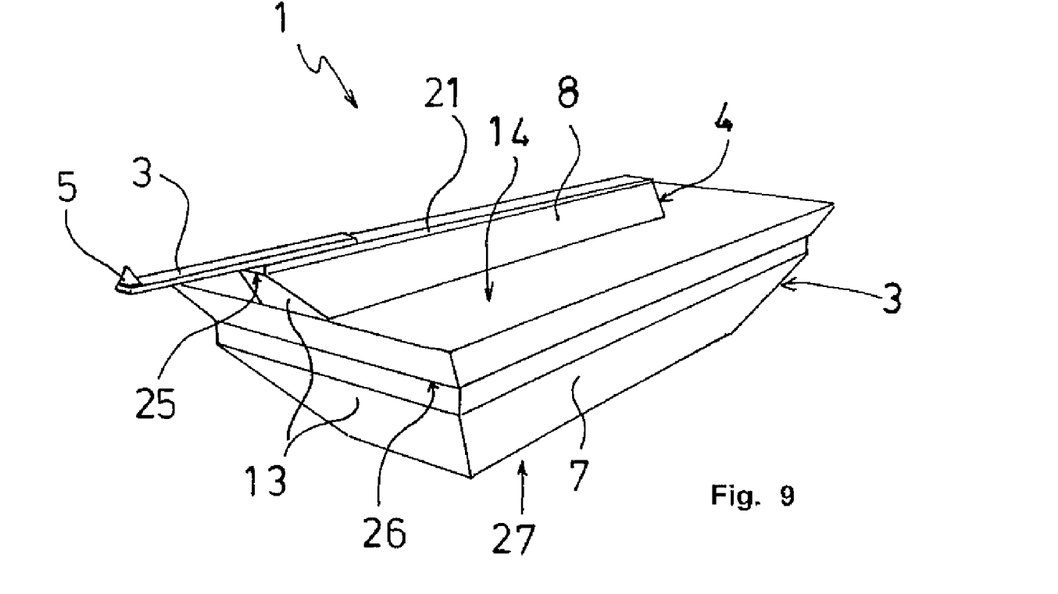
FIG. 9 shows a third SPM probe according to the invention with undercut lateral flanks and with a raised portion.
Figure 10:
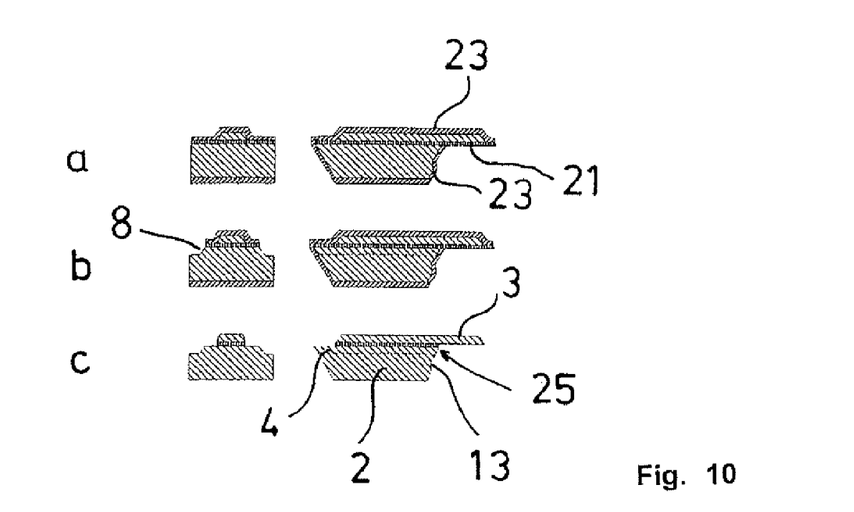
FIG. 10 shows a manufacturing process for the shaping of the SPM probe according to FIG. 9.

The process for the exact definition of the length of the cantilever 3 can be combined with the concept of the cantilever 3 with a raised portion 4 (FIG. 9). For this purpose, as shown in FIGS. 10a, b, after the etching of the cantilever 3 starting at the first material side 18, it is first necessary to open the window around the cantilever 3 and the area under the cantilever 3 must be completely etched. Then, the support element 2 is etched with sufficient over-etching from the second material side 19 so that the undercut <111> crystal plane forms below the cantilever 3. Then, the second material side 19 of the support element 2 including the face side flanks 9, 10, 13 that were etched from this side must be protected with a suitable protective film 23, consisting of silicon oxide or silicon nitride for example, and the raised portion 4 must be etched starting at the first material side 18. Finally, the protective films 23 are removed selectively according to FIG. 10c.

FIGS. 7 and 9 show the etching areas between the etch stop line 25, the constriction edge 26, and the top side 27 of the support element 2 in relation to each other (not to scale). Here, for the purpose of illustration, the etching areas below the constriction edge 26, i.e. in the direction of the cantilever 3, are shown overly large in height by a multiple factor relative to the rest of the support element 2. Especially in FIG. 9, the raised portion 4 [part of sentence missing in the German source document] so that the distance of the constriction edge 26 from the etch stop layer 21 is essentially the same in the two embodiments shown in the FIGS. 7, 9. Below the face side flank 13, all face side etching areas that extend from the top side 27 of the support element 2 to the etch stop layer 21 are combined.

Further features of the invention can be found in the following description of preferred embodiments of the invention in connection with the claims and the drawings. The single features can be realised alone or several together in embodiments of the invention.

The invention claimed is:

1. An SPM probe comprising:
an elongated support element having a raised portion;
a cantilever projecting beyond a front face of the support element and carrying a scanning tip, wherein:
  the raised portion extends in a longitudinal direction of the support element and the cantilever,
  the support element and the raised portion each have an essentially trapezoidal cross-section, each with a longer and a shorter transverse edge at the front face side flank,
  the cantilever is arranged at the raised portion of the support element and protrudes from a front face side flank of the support element at the shorter transverse edge, and
  the longer transverse edge of the support element is longer than the longer transverse edge of the raised portion and these longer transverse edges partially coincide to define a coinciding transverse edge equal in length to the longer transverse edge of the raised portion and located at an edge of the front face and an underside of the support element; and
critical corners at the coinciding transverse edge of the front face side flank that are closest to a sample during the scanning process;
wherein a plane, defined by a theoretical straight line passing through one of the critical corners as well as through the scanning tip and by a lateral longitudinal edge of the underside of the support element connected with the one of the critical corners, forms an angle of tilt of at least 5 degrees relative to the coinciding transverse edge.

2. An SPM probe according to claim 1, wherein the vertical distance H between the underside of the cantilever that carries the scanning tip and the underside of the support element that carries the raised portion amounts to at least 1/20 of the width L of the transverse edge of the support element on which the raised portion with the cantilever attached to it is arranged.

3. An SPM probe according to claim 1, wherein the base material for the support element and the cantilever is monocrystalline silicon, and that at least the face side flank of the support element to which the cantilever is attached is formed by a <111> plane of the silicon crystal.

4. An SPM probe according to claim 3, wherein the base material has an integrated etch stop layer in order to define the thickness of the cantilever.

5. An SPM probe according to claim 1, wherein the support element including the raised portion consists of one material, and the cantilever of a second material.

6. An SPM probe according to claim 5, wherein the support element and the raised portion consist of glass or silicon and the cantilever consists of an amorphous thin film.

7. An SPM probe according to claim 1, wherein the support element, the raised portion, and the cantilever each consists of a different material.

8. An SPM probe according to claim 7, wherein the support element consists of glass, the raised portion of silicon, and the cantilever of an amorphous thin film.

9. An SPM probe according to claim 1, wherein the longitudinal side flanks of the support element and the longitudinal side flanks of the raised portion have an identical inclination, and follow each other in a stepped arrangement.

10. An SPM probe according to claim 9, wherein at least the front face side flank has an undercut shape.

11. An SPM probe according to claim 1, wherein the face side flank is formed at least in part by a <111> plane of the silicon crystal, and, for manufacturing reasons, the <111> plane is determined by a transverse line that runs orthogonally to the direction of the cantilever above the underside of the support element facing the cantilever.

12. A process for the manufacture of an SPM probe with a support element and, attached to it, a cantilever that carries a scanning tip at its free end, according to claim 1, comprising the following steps:
 creating the shape of the cantilever and of the support element with the raised portion by etching steps starting at a first material side of the base material; and
 selecting the thickness of the cantilever by means of etching starting at the other, opposite, second material side of the base material,
 wherein the lateral longitudinal side flanks of the support element are shaped out of one material side of the base material, and the front face side flank to which the cantilever is attached is shaped from the other material side of the base material,
 the longitudinal side flanks of the probe as well as the form of the cantilever are shaped by means of anisotropic etching from one of the sides of the base material, then the relevant side of the base material, including the etched structures, are covered with an etch-resistant protective film, and thereafter at least the face side flank of the support element is etched by means of an anisotropic wet-chemical process, starting from opposite sides of the base material, and then the protective film is removed selectively, and
 first, the cantilever is created from the silicon layer above the etch stop from the first material side of the silicon wafer; then, the material side of the silicon wafer including the etched structures is covered with an etch-resistant protective film; subsequently, a window is opened in the etch-resistant protective film that excludes the cantilever and simultaneously defines an etch stop line of the support element, said line determining the length of the cantilever; after that, by means of an anisotropic wet-chemical process, the silicon inside the opened window is etched in such a way that the cantilever is completely exposed by etching under it and a <111> plane of the silicon crystal is formed below the cantilever; then, by means of an anisotropic wet-chemical process, the support element is created in such a way, starting at the second material side of the silicon wafer, that a <111> plane of the silicon crystal is formed as the face side flank by the etching process, the face side flank meeting the <111> plane formed previously from the opposite material side of the silicon wafer below the cantilever; then, while exploiting the fast etching attack on the exposed area between the two <111> planes etched from the front and back sides, the anisotropic wet-chemical process is continued until, at least in an area below the cantilever, a new <111> plane with undercut flank profile is formed; and after that, the protective film is removed selectively.

13. A process according to claim 12, wherein
 after the removal of the protective film an additional protective film is applied to the second material side of the silicon wafer, including the etch flanks,
 then, by means of an anisotropic wet-chemical process, the raised portion that includes the cantilever is created from the support element, starting at the first material side of the silicon wafer, and
 finally, the new protective film is removed again selectively.

14. A process for the manufacture of an SPM probe, with a support element and an attached cantilever that carries a scanning tip at its free end, according to claim 12, wherein at least the cantilever is first manufactured separately and is subsequently joined with the raised portion, with the support element and the raised portion made either from one piece or as an assembly.

* * * * *